US012008986B1

(12) United States Patent
Zeljkovic et al.

(10) Patent No.: US 12,008,986 B1
(45) Date of Patent: Jun. 11, 2024

(54) UNIVERSAL SEMI-WORD MODEL FOR VOCABULARY CONTRACTION IN AUTOMATIC SPEECH RECOGNITION

(71) Applicant: Interactions LLC, Franklin, MA (US)

(72) Inventors: Ilija Zeljkovic, Dedham, MA (US); Andrej Ljolje, Bernardsville, NJ (US)

(73) Assignee: Interactions LLC, Franklin, MA (US)

( * ) Notice: Subject to any disclaimer, the term of this patent is extended or adjusted under 35 U.S.C. 154(b) by 125 days.

(21) Appl. No.: 16/859,938

(22) Filed: Apr. 27, 2020

(51) Int. Cl.
*G10L 15/187* (2013.01)
*G10L 15/02* (2006.01)
*G10L 15/04* (2013.01)
*G10L 15/26* (2006.01)

(52) U.S. Cl.
CPC ............ *G10L 15/187* (2013.01); *G10L 15/02* (2013.01); *G10L 15/04* (2013.01); *G10L 15/26* (2013.01); *G10L 2015/025* (2013.01)

(58) Field of Classification Search
CPC ....... G10L 15/187; G10L 15/02; G10L 15/04; G10L 15/26; G10L 2015/025
See application file for complete search history.

(56) References Cited

U.S. PATENT DOCUMENTS

| | | | | |
|---|---|---|---|---|
| 5,832,478 A | * | 11/1998 | George | G06F 16/951 382/229 |
| 7,657,430 B2 | * | 2/2010 | Ogawa | G10L 15/04 704/243 |
| 9,286,894 B1 | * | 3/2016 | Weintraub | G10L 15/32 |
| 2003/0088416 A1 | * | 5/2003 | Griniasty | G10L 13/08 704/260 |
| 2003/0110035 A1 | * | 6/2003 | Thong | G10L 15/083 704/254 |
| 2011/0055227 A1 | * | 3/2011 | Igarashi | H04N 7/15 707/750 |
| 2013/0151236 A1 | * | 6/2013 | Iofinov | G06F 16/24524 704/9 |

FOREIGN PATENT DOCUMENTS

| | | | |
|---|---|---|---|
| JP | 2000020087 A | * | 1/2000 |
| JP | 2011007862 A | * | 1/2011 |

* cited by examiner

*Primary Examiner* — Pierre Louis Desir
*Assistant Examiner* — Keisha Y. Castillo-Torres
(74) *Attorney, Agent, or Firm* — Fenwick & West LLP

(57) ABSTRACT

A speech recognition system includes, or has access to, conventional speech recognizer data, including a conventional acoustic model and pronunciation dictionary. The speech recognition system generates restructured speech recognizer data from the conventional speech recognizer data. When used at runtime by a speech recognizer module, the restructured speech recognizer data produces more accurate and efficient results than those produced using the conventional speech recognizer data. The restructuring involves segmenting entries of the conventional pronunciation dictionary and acoustic model according to their constituent phonemes and grouping those entries with the same initial N phonemes, for some integer N (e.g., N=3), and deriving a restructured dictionary with a corresponding semi-word acoustic model for the various grouped entries. The decomposition of the conventional pronunciation dictionary into the restructured dictionary with semi-word acoustic model greatly reduces the number of possibilities in the dictionaries (e.g., from potentially unlimited to finite and relatively small), and also improves the accuracy of speech recognition.

13 Claims, 5 Drawing Sheets

UNIVERSAL SEMI-WORD MODEL FOR VOCABULARY CONTRACTION IN AUTOMATIC SPEECH RECOGNITION

FIELD OF ART

The disclosed embodiments relate to automated speech recognition, and more specifically, to contracting a large language vocabulary for efficient one pass and multiple pass recognition.

BACKGROUND

Speech recognition systems are specialized computers that are configured to process and recognize human speech and may also take action or carry out further processes. Developments in speech recognition technologies support "natural language" type interactions between automated systems and users, allowing a user to speak naturally, e.g., when providing commands to a computer application.

Many speech recognition systems define words in a given vocabulary as a sequence of phonemes. In such systems, for each word in the vocabulary, the mapping of words into phoneme sequences must be known and specified in the system dictionary. However, some vocabularies are large, or even unbounded in the case of vocabularies to which new words are continually added. Some examples of such large, unconstrained vocabularies are personal first and last names of a name recognition vocabulary, a vocabulary allowing a user to spell a word (e.g., "A as in apple, C as in cat, E as in Edward"), or a general language stochastic model where the number of words is unknown and changing. The dictionaries for such vocabularies require large amounts of storage space, and also produce results of limited accuracy.

SUMMARY

A speech recognition system includes, or has access to, conventional speech recognizer data, including a conventional acoustic model and pronunciation dictionary. The speech recognition system generates restructured speech recognizer data from the conventional speech recognizer data. When used at runtime by a speech recognizer module, the restructured speech recognizer data produces more accurate and efficient results for specific uses than those produced using the conventional speech recognizer data.

The restructuring involves segmenting entries of the conventional pronunciation dictionary and acoustic model according to their constituent phonemes and grouping those entries with the same initial N phonemes, for some integer N (e.g., N=3), and deriving a restructured dictionary with a corresponding semi-word acoustic model for the various grouped entries. The decomposition of the conventional pronunciation dictionary into the restructured dictionary with semi-word acoustic model greatly reduces the number of possibilities in the dictionaries (e.g., from potentially unlimited to finite and relatively small), and also improves the accuracy of speech recognition. The same approach can be used to model word endings, ignoring the differences between the heads of the words, such as example to model inflections, declinations, parts-of-speech etc.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
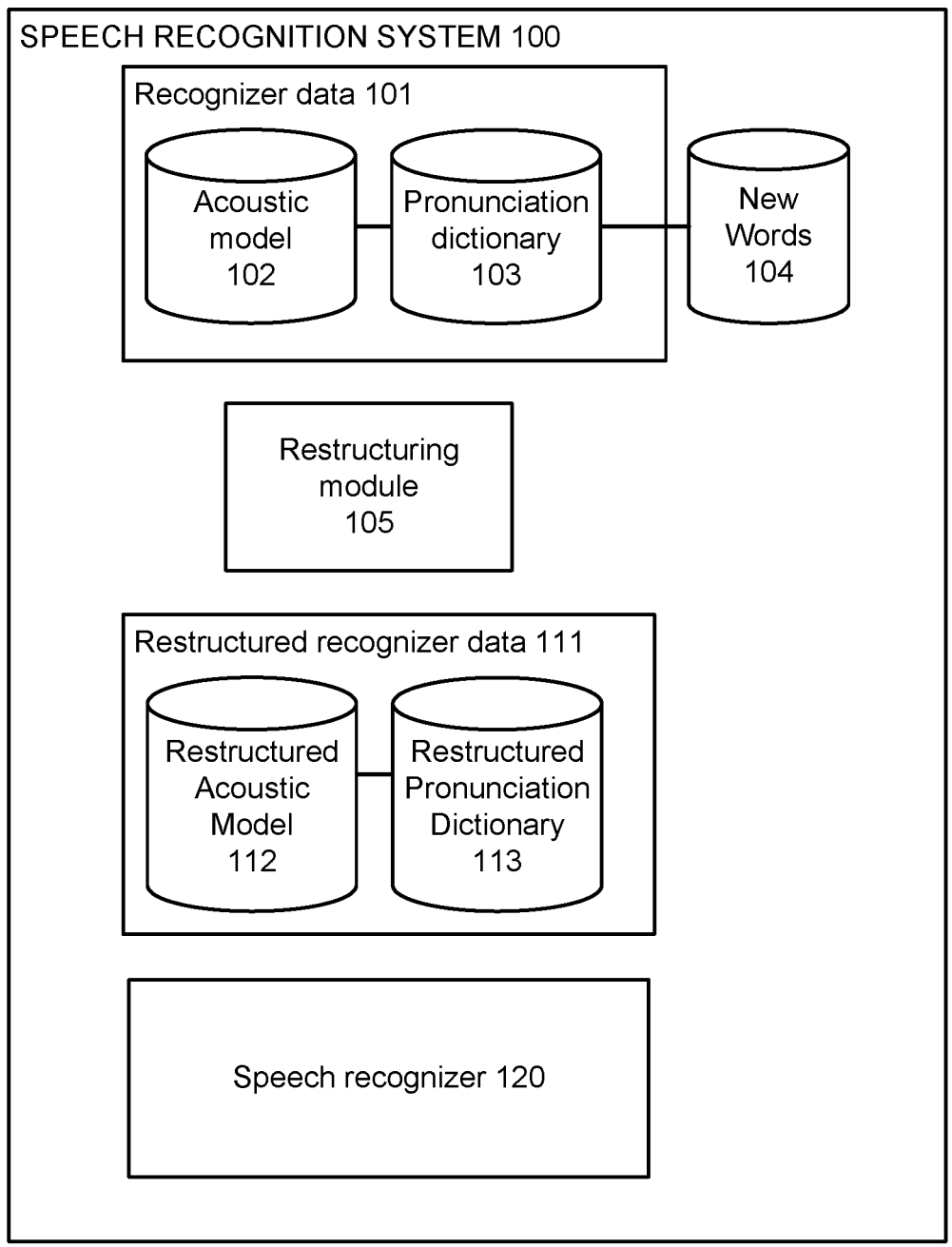
FIG. 1 is a block diagram illustrating the components of a speech recognition system in which an existing pronunciation dictionary and acoustic model with new words are restructured into a restructured dictionary and acoustic model, according to some embodiments.

FIG. 1 is a block diagram illustrating the components of a speech recognition system 100 in which an existing pronunciation dictionary is restructured, according to some embodiments. The speech recognition system 100 can be used to process natural language utterances of users, such as in the processing and interpretation of a user conversation with a customer service system (e.g., "I want to book a flight to Copenhagen"). Such conversations may be conducted by users of the customer service system using their client devices (e.g., cellular phones, landline phones, tablets, laptop computers, or the like) via a network such as the internet (not shown in FIG. 1).

The speech recognition system 100 includes, or has access to, speech data used to build the Pronunciation Dictionary 103 and Acoustic Model, 102, with any New Words, 104. The speech recognition system 100 further uses a restructuring module 105 to generate restructured recognizer data 111 that, when used at runtime, combined with the recognizer data 101, by a speech recognizer module 120, produces more accurate and efficient results for specific conversations than those produced using the conventional data 101 alone. These components are now described in more detail, below.

The pronunciation dictionary 103 of the conventional recognizer data 101 maps a word in the associated vocabulary to a sequence of phonemes indicating the pronunciation of the word in the language of the vocabulary. The pronunciation dictionary 103 has a corresponding acoustic model 102 representing the sound characteristics of the phonemes in the language. Together, the pronunciation dictionary 103 and its corresponding acoustic model 102 can be used to recognize speech at runtime.

Figure 2:
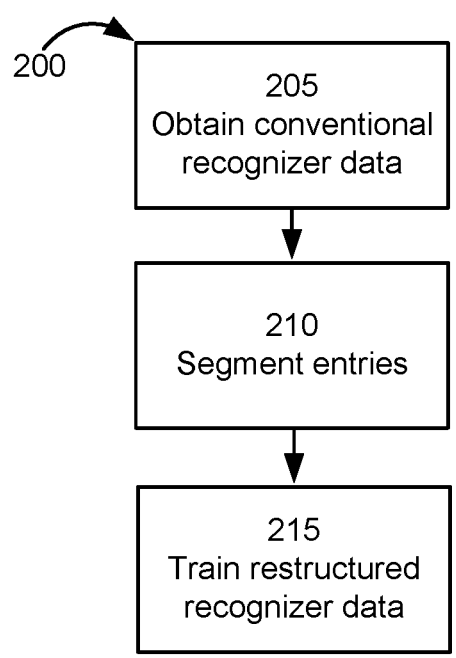
FIG. 2 is a flowchart illustrating steps in restructuring an existing Pronunciation Dictionary and Acoustic Model into Restructured Pronunciation Dictionary and Acoustic Model, according to some embodiments.

As illustrated in FIG. 2, the restructuring module 105 obtains 205 the conventional recognizer data 101 as input and segments 210 the entries of the dictionary into the N initial phonemes and all remaining phonemes. Using this segmentation, the restructuring module 105 trains 215 restructured recognizer data 111, which includes a restructured pronunciation dictionary 113 and a corresponding acoustic model 112. These operations are illustrated below in more detail with respect to FIG. 3.

Although in the embodiment of FIG. 1 the restructuring module 105 and the speech recognizer module 120 are illustrated as both being part of the speech recognition system 100, in other embodiments the restructuring module 105 operates on one system, and the speech recognizer module 120 operates on another. Thus, creation and use of the restructured recognized data 111 can be decoupled. Additionally, although only one set of recognizer data 101 and restructured recognizer data 111 are shown, there could be any number of such sets, each corresponding to a particular vocabulary.

Figure 3:
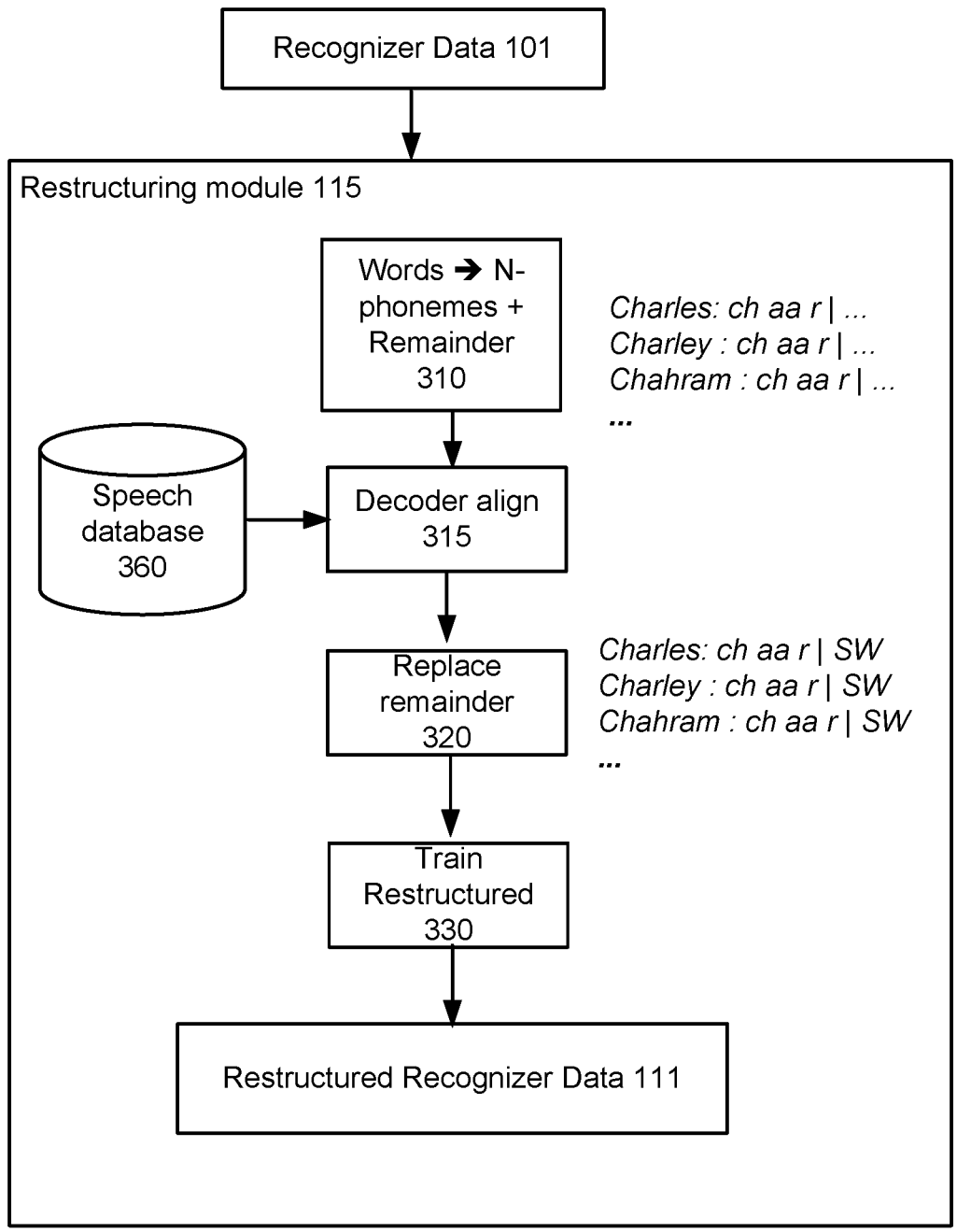
FIG. 3 is a data flow diagram illustrating the restructuring of conventional recognizer data into restructured recognizer data, according to some embodiments.

FIG. 3 is a data flow diagram illustrating the restructuring of the conventional recognizer data 101 into the restructured recognizer data 111, according to some embodiments.

The restructuring begins with the conventional pronunciation dictionary 103 and its corresponding acoustic model 102. The words of the conventional pronunciation dictionary 103 can be augmented with New Words, 104, creating the combined Speech database, 360. For example, the pronunciation dictionary 103 could represent some general subset of the English language, and the New Words, 104, could represent a particular domain of additional, non-general words, such as new proper names, or product names for a particular manufacturer.

The restructuring module 115 analyzes the words in the pronunciation dictionary 103 such that the first N phonemes (for an integer N, such as 2 or 3) of the words are distinguished from the remaining phonemes (if any) beyond the first N. (The restructuring module 115 may choose N dynamically based on the number of words of the original vocabulary of focus, with a larger N for larger vocabularies. Alternatively, N may be fixed. In either case, N is predetermined with respect to a given pronunciation dictionary.) The words having the same first N phonemes are then grouped together, and their remaining phonemes grouped together. As one simplified example, if the pronunciation dictionary 103 (e.g., after being supplemented by a New Words 104 containing new proper names) contains the three word entries Charles, Charley, and Chahram, respectively represented with the phonemes "ch, aa, r, l, z", "ch, aa, r, ly", and "ch, aa, r, ax, m", and N=3, those three word entries would have their phonemes segmented as follows: "ch, aa, r|l, z", "ch, aa, r|ly", and "ch, aa, r|ax, m", where the '|' symbol indicates the division between the first and the remaining N=3 phonemes. Since the initial N phonemes of these three-word entries are the same, they (and any other word entries also having the same initial N phonemes) are structured together.

In order to accomplish this segmentation of phonemes, the restructuring module, 115, first segments 310 the first N-phonemes and the remainder. The Decoder Align, 315, with the Speech Database 360 used to build the Recognizer Data, 101, aligns the phonemes with speech. Based on the alignment, the restructuring module 115 replaces, 320, the remaining phonemes after the initial N with a reference to a "semi-word" representing the remainder of the phonemes after their initial N phonemes, generating Restructured Recognizer Data (Restructured Pronunciation Dictionary, 113 and Restructured Acoustic Model 112). Continuing the example above, since the three word entries share the same initial N phonemes, they would become part of the same single entry "ch, aa, r|<SW>", where <SW> indicates a reference to the semi-word (SW). This resulting dictionary, with entries corresponding to groupings of the first N phonemes with the remainder of their phonemes replaced with a reference to the semi-word, constitutes the Restructured Pronunciation Dictionary 113 for that particular grouping of the same N initial phonemes which enables the speech recognizer module 120, using the Language Model, 410, to isolate those phonemes of semi-word separating the phonemes of (for example) "iphone" from the phonemes of "Charles". For instance, in the example above, the Restructured Pronunciation Dictionary 113 corresponds to the 3-phoneme sequence "ch, aa, r". The Restructured Pronunciation Dictionary 113 includes for each sequence in the original pronunciation dictionary 103, that distinct N-phoneme sequence followed by the newly created phoneme semi-word after that N-phoneme sequence; referred to as the semi-word (or, for brevity, "SW"). In the Language Model, 410, the vocabulary is compressed by replacing parts of the words with SW to save space and improve efficiency, in some embodiments.

Training Restructured, 330 results in training the Restructured Pronunciation Dictionary, 112, and the Restructured Acoustic Model, 113; this uses a form of machine learning based on the separation of the first N phonemes from the remaining phonemes. Deep learning may be employed for this purpose using a multi-level neural network.

Note that the above restructuring of the conventional Recognizer Data 101 into the Restructured Recognizer Data 111 reduces a vocabulary with potentially unlimited entries into a limited one (one for each N-phoneme grouping) for those words of interest, improving accuracy.

Figure 4:
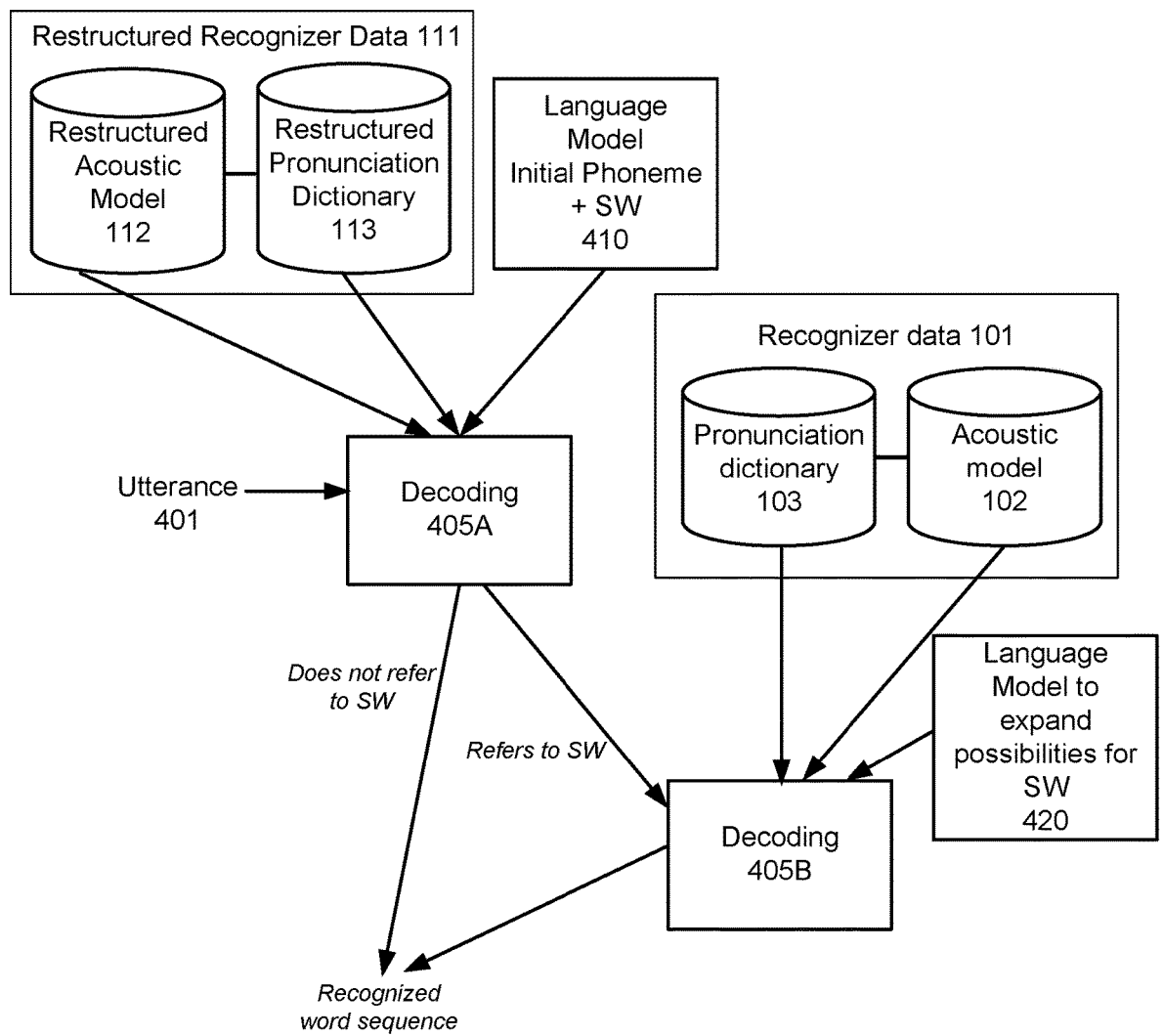
FIG. 4 is a data flow diagram illustrating the use of the restructured recognizer data by the runtime to recognize speech, according to some embodiments.

FIG. 4 is a data flow diagram illustrating the use of the restructured recognizer data 111 by the speech recognizer module 120 in a two-level recognition of speech, according to some embodiments.

An utterance 401 is received, e.g., from a user. The utterance is processed by first decoding logic 405A corresponding to the Restructured Recognizer Data, 111, first breaking the utterance into its distinct phonemes, and for each identifying its initial N phonemes and looking up the corresponding entry in the restructured pronunciation dictionary 113, which may or may not correspond to the words of interest. If the decoding logic 405A, using the Language Model 410 to focus on the words of interest, determines that the corresponding phonemes of the Restructured Recognizer Data, 111 do correspond-thereby indicating that there are additional phonemes to be recognized-then the speech recognizer module 120 uses the Recognizer Data 101, to further decode the remaining phonemes of SW so as to recognize the entire word in some implementations. The Language Model uses the SW component to reduce the search space for the decoder by reducing the number of possibilities in the vocabulary. If the decoding logic 405A determines that the corresponding Restructured Recognizer Data, 111, for the phonemes do not refer to a semi-word, then it recognizes the word itself, without any further recognition required.

As a specific example, for a phoneme segmentation value of N=3, if utterance 401 were produced in a real-time conversation for a system with words of interest of proper names, the utterance might be the phrase "I want to find Charles." The speech recognizer module 120, using a Language Model to focus 410, would use the decoding logic 405A to determine that the words, "I want to find", do not include a reference to SW and would therefore accordingly produce the words "I" "want", "to", and "find". However, when the decoding logic 405A determines that the word "Charles" corresponds to a SW phoneme sequence of "ch, aa, r", accordingly, the speech recognizer module 120 would use the SW Language Model, 420, along with decoding logic 405B corresponding to the original Recognizer Data, 101, using the SW language model 420 to expand, the SW part "-les" in combination with the initial "ch, aa, r" portion to the word "Charles".

Those skilled in the art can see that the above-described SW method could be used anywhere within a phoneme sequence (e.g., at the beginning of a word rather than at the end), and that even multiple occurrences of SW could be used to increase accuracy and reduce the number of possible phoneme sequences to be recognized.

Figure 5:
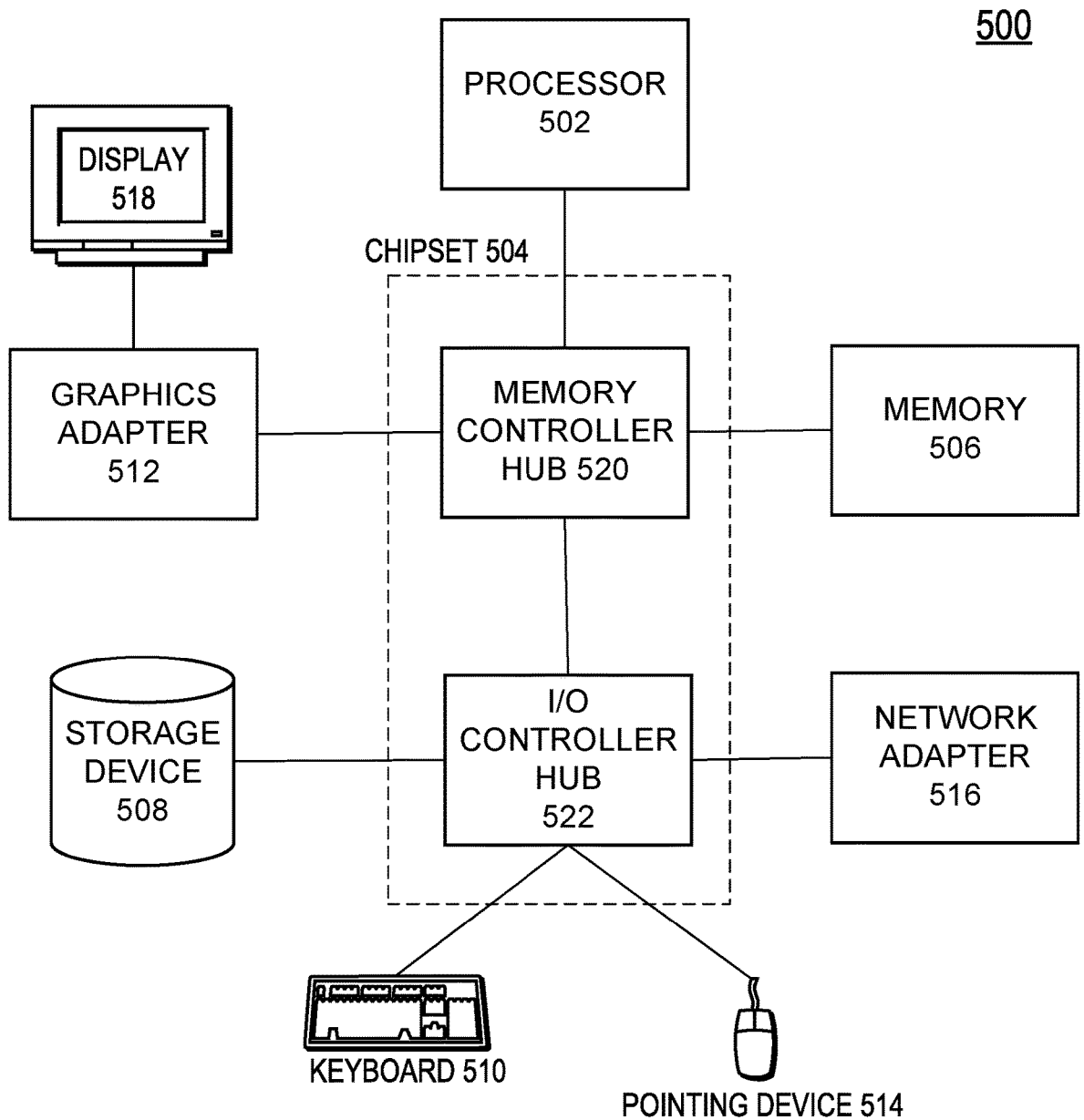
FIG. 5 is a high-level block diagram illustrating physical components of a computer used as part or all of the speech recognition system from FIG. 1, according to one embodiment.

FIG. 5 is a high-level block diagram illustrating physical components of a computer 500 used as part or all of the speech recognition system 100 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a graphics adapter 512, and/or display 518, as well as a keyboard or pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of a speech recognition system for recognizing a natural language utterance, the method comprising:
    accessing a pronunciation dictionary that maps words in an associated vocabulary to corresponding sequences of phonemes, and an acoustic model representing sound characteristics of phonemes in a language associated with the pronunciation dictionary;
    for a given predetermined number of phonemes, segmenting the words of the pronunciation dictionary into (i) an initial sequence of the predetermined number of phonemes, and (ii) a reference to a semi-word model representing a sequence of remaining phonemes in whole words that follow the predetermined number of phonemes;
    creating a restructured pronunciation dictionary based on the segmented initial sequences of phonemes and references to semi-word models representing sequences of remaining phonemes, the restructured pronunciation dictionary containing references to a semi-word model for words having more than the predetermined number of phonemes;
    using a multi-level neural network to train a restructured acoustic model for the acoustic model based on the segmented initial sequences of phonemes and references to semi-word models;
    receiving a natural language utterance;
    segmenting the natural language utterance into words at least in part using the restructured acoustic model; and
    for at least one of the words:
        recognizing, using the restructured pronunciation dictionary, a first sequence of the predetermined number of phonemes,
        determining, based on a presence of a reference to a semi-word model in the restructured pronunciation dictionary, that there are additional phonemes to be recognized in the word following the sequence of the predetermined number of phonemes, and
        responsive to determining that there are additional phonemes to be recognized in the word following the sequence of the predetermined number of phonemes, using at least one semi-word model for a part of the word to recognize text of the word.

2. The computer-implemented method of claim 1, further comprising:
    for a second one of the words:
        determining that an entry in the restructured pronunciation dictionary corresponding to phonemes of the word does not refer to a semi-word model; and
        responsive to the determining, recognizing the text of the word without using a semi-word model.

3. The computer-implemented method of claim 1, further comprising determining any number of combinations of phonemes followed by a semi-word, responsive to recognizing the text using a semi-word model.

4. The computer-implemented method of claim 1, further comprising predetermining the predetermined number of phonemes for the restructured pronunciation dictionary based on a number of words in the pronunciation dictionary.

5. A non-transitory computer-readable storage medium storing instructions that when executed by a computer processor perform actions comprising:
    accessing a pronunciation dictionary that maps words in an associated vocabulary to corresponding sequences of phonemes, and an acoustic model representing sound characteristics of phonemes in a language associated with the pronunciation dictionary;
    for a given predetermined number of phonemes, segmenting the words of the pronunciation dictionary into (i) an initial sequence of the predetermined number of phonemes, and (ii) a reference to a semi-word model representing a sequence of remaining phonemes in whole words that follow the predetermined number of phonemes;
    creating a restructured pronunciation dictionary based on the segmented initial sequences of phonemes and references to semi-word models representing sequences of remaining phonemes, the restructured pronunciation dictionary containing references to a semi-word model for words having more than the predetermined number of phonemes;
    using a multi-level neural network to train a restructured acoustic model for the acoustic model based on the segmented initial sequences of phonemes and references to semi-word models;
    receiving a natural language utterance;
    segmenting the natural language utterance into words at least in part using the restructured acoustic model; and
    for at least one of the words:
        recognizing, using the restructured pronunciation dictionary, a first sequence of the predetermined number of phonemes in the word,
        determining, based on a presence of a reference to a semi-word model in the restructured pronunciation dictionary, that there are additional phonemes to be recognized in the word following the sequence of the predetermined number of phonemes, and
        responsive to determining that there are additional phonemes to be recognized in the word following the sequence of the predetermined number of phonemes, using at least one semi-word model for a remainder of the word comprising the additional phonemes to recognize text of the word.

6. The non-transitory computer-readable storage medium of claim 5, the actions further comprising:
    for a second one of the words:
        determining that an entry in the restructured pronunciation dictionary corresponding to phonemes of the word does not refer to a semi-word model; and
        responsive to the determining, recognizing the text of the word without using a semi-word model.

7. The non-transitory computer-readable storage medium of claim 5, the actions further comprising determining any number of combinations of phonemes followed by a semi-word, responsive to recognizing the text using a semi-word model.

8. The non-transitory computer-readable storage medium of claim 5, the actions further comprising predetermining the predetermined number of phonemes for the restructured pronunciation dictionary based on a number of words in the pronunciation dictionary.

9. A speech recognition system comprising:
a computer processor; and
a non-transitory computer-readable storage medium storing instructions that when executed by the computer processor perform actions comprising:
accessing a pronunciation dictionary that maps words in an associated vocabulary to corresponding sequences of phonemes, and an acoustic model representing sound characteristics of phonemes in a language associated with the pronunciation dictionary;
for a given predetermined number of phonemes, segmenting the words of the pronunciation dictionary into (i) an initial sequence of the predetermined number of phonemes, and (ii) a reference to a semi-word model representing a sequence of remaining phonemes in whole words that follow the predetermined number of phonemes;
creating a restructured pronunciation dictionary based on the segmented initial sequences of phonemes and references to semi-word models representing sequences of remaining phonemes, the restructured pronunciation dictionary containing references to a semi-word model for words having more than the predetermined number of phonemes;
using a multi-level neural network to train a restructured acoustic model for the acoustic model based on the segmented initial sequences of phonemes and references to semi-word models;
receiving a natural language utterance;
segmenting the natural language utterance into words at least in part using the restructured acoustic model; and
for at least one of the words:
recognizing, using the restructured pronunciation dictionary, a first sequence of the predetermined number of phonemes,
determining, based on a presence of a reference to a semi-word model in the restructured pronunciation dictionary, that there are additional phonemes to be recognized in the word following the sequence of the predetermined number of phonemes, and
responsive to determining that there are additional phonemes to be recognized in the word following the sequence of the predetermined number of phonemes, using at least one semi-word model for a part of the word to recognize text of the word.

10. The speech recognition system of claim 9, the actions further comprising:
for a second one of the words:
determining that an entry in the restructured pronunciation dictionary corresponding to phonemes of the word does not refer to a semi-word model; and
responsive to the determining, recognizing the text of the word without using a semi-word model.

11. The speech recognition system of claim 9, the actions further comprising determining any number of combinations of phonemes followed by a semi-word, responsive to recognizing the text using a semi-word model.

12. The speech recognition system of claim 9, the actions further comprising predetermining the predetermined number of phonemes for the restructured pronunciation dictionary based on a number of words in the pronunciation dictionary.

13. A computer-implemented method of a speech recognition system for recognizing a natural language utterance, the method comprising:
accessing a pronunciation dictionary that maps words in an associated vocabulary to corresponding sequences of phonemes, and an acoustic model representing sound characteristics of phonemes in a language associated with the pronunciation dictionary;
for a given predetermined number of phonemes, segmenting the words of the pronunciation dictionary into (i) an initial sequence of the predetermined number of phonemes, and (ii) a reference to a semi-word model representing a sequence of remaining phonemes in whole words that follow the predetermined number of phonemes;
creating a restructured pronunciation dictionary based on the segmented initial sequences of phonemes and references to semi-word models representing sequences of remaining phonemes, the restructured pronunciation dictionary containing references to a semi-word model for words having more than the predetermined number of phonemes;
using a multi-level neural network to train a restructured acoustic model for the acoustic model based on the segmented initial sequences of phonemes and references to semi-word models;
receiving a natural language utterance;
segmenting the natural language utterance into words at least in part using the restructured acoustic model; and
for at least one of the words:
recognizing, using the restructured pronunciation dictionary, a first sequence of the predetermined number of phonemes within the word,
determining, based on a presence of a reference to a semi-word model in the restructured pronunciation dictionary, that there are additional phonemes to be recognized in the word following the sequence of the predetermined number of phonemes, and
responsive to determining that there are additional phonemes to be recognized in the word following the sequence of the predetermined number of phonemes, using at least one semi-word model for phonemes of the word, other than the phonemes of the first sequence, to recognize text of the word.

* * * * *